United States Patent [19]

Grossi et al.

[11] 4,436,767

[45] Mar. 13, 1984

[54] SLURRY SEAL METHOD USING ACRYLAMIDE AND RUBBER MODIFIED ASPHALTIC EMULSION

[75] Inventors: Anthony V. Grossi; Louis T. Hahn; Alfred Marzocchi, all of Newark; Charles E. Bolen, Heath, all of Ohio

[73] Assignee: Owens-Corning Fiberglas Corporation, Toledo, Ohio

[21] Appl. No.: 453,067

[22] Filed: Dec. 27, 1982

[51] Int. Cl.³ .............................................. B05D 5/10
[52] U.S. Cl. .................................. 427/138; 525/54.5; 525/500; 524/521; 524/186
[58] Field of Search ..................... 427/138; 525/54.5; 527/500; 524/186, 521

[56] References Cited

U.S. PATENT DOCUMENTS

| | | | |
|---|---|---|---|
| 2,716,616 | 8/1955 | Rendall et al. | 106/273 |
| 2,888,407 | 5/1959 | Cooper et al. | 260/2.5 |
| 3,096,190 | 7/1963 | De Groote et al. | 106/273 |
| 3,259,512 | 7/1966 | Dickson et al. | 106/273 |
| 3,303,151 | 2/1967 | Peters et al. | 260/28.5 |
| 3,513,005 | 5/1970 | Bradshaw et al. | 106/277 |
| 3,547,850 | 12/1970 | Montgomery | 260/28.5 |
| 3,997,354 | 12/1976 | Pivette | 106/273 N |
| 4,273,588 | 6/1981 | Marzocchi et al. | 106/273 N |
| 4,273,685 | 6/1981 | Marzocchi et al. | 524/71 |
| 4,316,829 | 2/1982 | Roberts | 106/273 |
| 4,394,481 | 9/1983 | Grossi et al. | 527/500 |

FOREIGN PATENT DOCUMENTS 49-52287  5/1974  Japan .

*Primary Examiner*—Melvyn I. Marquis
*Attorney, Agent, or Firm*—Ronald C. Hudgens; Robert F. Rywalski

[57] ABSTRACT

An improvement in pavement surface-treating methods is provided of the type wherein a slurry seal composition is applied to the pavement the composition comprising aggregate in a slow setting asphaltic emulsion. The improvement resides in combining with the slow setting asphaltic emulsion in effective breaktime decreasing amount of an emulsion containing a chemically modified asphalt which is the prereacted reaction product of an acrylamide, asphalt having a viscosity of less than 120,000 cps (at 140° F.), a vinyl aromatic monomer and a rubbery polymer.

11 Claims, No Drawings

SLURRY SEAL METHOD USING ACRYLAMIDE AND RUBBER MODIFIED ASPHALTIC EMULSION

TECHNICAL FIELD

The present invention relates to pavement surface treating methods, and more particularly, it relates to providing an asphaltic coating on distressed cementitous vehicular supporting surfaces using a slurry seal method. Even yet more specifically, the present invention relates to modifying a conventional slurry seal composition by incorporating therein an emulsion containing an acrylamide and rubber modified emulsifiable asphaltic material.

BACKGROUND AND SUMMARY

Distressed cementitous, for example, asphalt and concrete, vehicular supporting surfaces like roads, highways, parking lots, runways and the like have been provided with a new wearcourse by means of a slurry seal technique for many years. This technique, while primarily employed for corrective maintenance of pavement surfaces, has also been used as a preventative measure. In such a technique, aggregate, water and an asphaltic emulsion are combined in a mixer mounted on a moving truck to form a slurry and the slurry is discharged to a spreader box where it, in turn, is discharged, while the truck is continuously moving, to the pavement surface to be treated. A squeegee is usually attached to the spreaderbox to provide a uniform coating on the pavement. The aggregate employed may be calcareous, siliceus or granitic. The size of such slurry seal aggregate as recommended by the International Slurry Seal Association is set forth in A BASIC ASPHALT EMULSION MANUAL prepared by THE ASPHALT INSTITUTE for the UNITED STATES DEPARTMENT OF TRANSPORTATION (FHWA-OIP-79-1) at page 52.

In contrast to a rapid set emulsion which has virtually no ability to mix with such slurry seal aggregate, because of a substantially instantaneous hardening of such mixture, slurry seal compositions typically employ a slow setting emulsion. Those slow set emulsions typically are cationic emulsions and are designed to mix with aggregate and water so as to form a flowable slurry in the slurry-truck mixer which slurry can be readily discharged and dispensed from the spreaderbox onto the pavement to be treated. In order to provide the needed mix time, the slow set emulsions unfortunately also provide the slurry seal composition with a long break time, that is the time for the asphalt and aggregate phase to separate, or break, from the water phase. More recently, quicker setting, slow set emulsions have been finding utility in slurry seal treatment processes and are generally referred to in the trade as a quick set emulsion. Such quicker setting, slow set emulsions, like the older slow set emulsions, also need to have their break time decreased while allowing for adequate mixing time in the mixer of a slurry seal application truck. Additionally, the properties of the asphalt employed in such emulsions need to be improved.

In accordance with the present invention, an asphaltic emulsion is provided which is adapted for use in slurry seal surface treating technology which has an improved break time, that is decreased break times, adequate mixing time in conventional slurry seal equipment and which has improved properties.

Thus, in accordance with the present invention, an improvement in pavement surface treating methods is provided of the type which comprises combining a slow setting asphaltic emulsion and aggregate in a mixer, and while moving the mixer along said pavement to be surface treated, mixing said emulsion and aggregate to form a flowable slurry seal composition and substantially continuously discharging said slurry seal composition onto said pavement whereby the composition breaks and then subsequently cures to provide a traffic resistant surface treatment. The improvement resides in combining with the asphaltic emulsion a rapid setting emulsion containing the reaction product of an acrylamide, asphalt having a viscosity of less than 120,000 cps (at 140° F.), a vinyl aromatic monomer and a rubbery polymer with the rapid setting emulsion being present in an effective breaktime decreasing amount, that is in an amount sufficient to increase the rate at which the emulsion breaks. While the amount of the rapid setting emulsion which is employed will decrease the mixing time it, of course, will be apparent that the material is not added in such quantities as to prevent necessary mixing and the formation of a flowable slurry using conventional slurry seal mixers. The incorporation of the rapid setting emulsion into the slow setting emulsion imparts desirable properties to the slurry seal composition and more specifically, the asphalt components thereof. Such desirable properties include improved coatability of various surfaces, including aggregate, improved adhesion characteristics, less stripping, improved flexibility, particularly at low temperatures, improved strength and toughness, reduced high temperature flow, and increased durability.

DESCRIPTION AND INDUSTRIAL EXPLOITATION

The present invention may be industrially exploited by employing conventional slurry seal equipment which is generally referred to as a travelling mixing plant wherein the aggregate, water and emulsion, and optionally portland cement, are converted into a slurry and then applied in a continuous manner onto the pavement to be treated for preventitive or maintenance purposes. The majority of the raw materials employed in practicing the present invention are those conventionally employed in the known slurry seal technology, namely the asphaltic emulsion and aggregate. Since the vast majority of slurry seal applications employ a slow setting cationic asphaltic emulsion, the present invention will primarily be described with respect to such a system. Thus, as generally indicated above, a conventional slurry seal technique is employed with the significant difference being that a rapid setting cationic emulsion is added to the slow setting cationic conventional slurry seal emulsion, the rapid setting emulsion containing the prereacted reaction product of an acrylamide asphalt having a viscosity of less than about 120,000 cps (140° F.), a vinyl aromatic monomer and a rubbery polymer. The cationic rapid setting emulsion may be combined, or blended, with the conventional slow setting, in any convenient manner. For example, it may be combined with a conventional cationic slow setting emulsion prior to charging the slurry seal truck with the emulsion, or it may be added directly to the emulsion tank of the slurry seal truck and mixed therein or, if desired, it may be added from a separate chamber directly into the mixer.

The asphaltic material employed in the cationic rapid setting emulsion is the reaction product of asphalt, and acrylamide, a vinyl aromatic monomer, and a rubbery polymer. The method of producing such material and forming an emulsion therefrom is further elaborated upon in co-pending application U.S. Ser. No. 329,902, now U.S. Pat. No. 4,394,481,and in concurrently filed application U.S. Ser. No. 453,031.

The acrylamides employed are unpolymerized and have a double bond. Desirably, they may be secondary amides or tertiary amides. Preferably, the acrylamide will be a compound of the formula $$(R_1)(R_2)C=C(R_3)-C(O)N(R_4)(R_5)$$

wherein $R_1$, $R_2$ and $R_3$ are independently selected from hydrogen or an alkyl containing 1 to 3 carbon atoms; $R_4$ and $R_5$ are independently selected from hydrogen, an alkyl containing 1 to 3 carbon atoms, or preferably a radical of the formula $$-R_6-N(R_7)(R_8)$$

wherein $R_7$ and $R_8$ are independently selected from hydrogen or an alkyl having 1 to 3 carbon atoms, and $R_6$ is an alkylene group containing 1 to 5 carbon atoms. The preferred acrylamide is dimethylaminopropylmethacrylamide, that is a compound of the formula $$CH_2=C(CH_3)C(O)N(H)(CH_2)_3N(CH_3)_2$$

The double bond provides for the ability to chemically incorporate the acrylamide into the composition. Additionally, the amino groups present in the acrylamides provide for highly desirable polarity which serves to greatly enhance the adhesive bonding of the present compositions to various substances, including, for example, aggregates commonly employed in road repair and maintenance, as well as cementitious and other substrates. Representative acrylamides include the following amino acrylamides:
N,N-dimethylaminopropylmethacrylamide,
N,N-dimethylaminoisopropylmethacrylamide,
N,N-dimethylaminoethylmethacrylamide,
N-methylaminopropylmethacrylamide,
N-methylaminoisopropylmethacrylamide, N-methylaminoethylmethacrylamide, aminopropylmethacrylamide, aminoisopropylmethacrylamide, aminoethylmethacrylamide,
N,N-diethylaminopropylmethacrylamide,
N,N-diethylaminoisopropylmethacrylamide,
N,N-diethylaminoethylmethacrylamide,
N-ethylaminopropylmethacrylamide,
N-ethylaminoisopropylmethacrylamide,
N-ethylaminoethylmethacrylamide,
N-ethyl,N-methylaminopropylmethacrylamide,
N-ethyl,N-methylaminoisopropylmethacrylamide,
N-ethyl,N-methylaminoethylmethacrylamide,
N,N-diethylaminopropylacrylamide,
N,N-dimethylaminoisopropylacrylamide,
N,N-dimethylaminoethylacrylamide,
N-methylaminopropylacrylamide,
N-methylaminoisopropylacrylamide,
N-methylaminoethylacrylamide, aminopropylacrylamide, aminoisopropylacrylamide, aminoethylacrylamide,
N,N-diethylaminopropylacrylamide,
N,N-diethylaminoisopropylacrylamide,
N,N-diethylaminoethylacrylamide,
N-ethylaminopropylacrylamide,
N-ethylaminoisopropylacrylamide,
N-ethylaminoethylacrylamide,
N-ethyl,N-methylaminopropylacrylamide,
N-ethyl,N-methylaminoisopropylacrylamide,
N-ethyl,N-methylaminoethylacrylamide.

The asphalt employed will have a viscosity of less than about 120,000 cps (at 140° F.), preferably less than about 75,000 cps (at 140° F.). Outstanding materials are produced from asphalt having a viscosity of about 40,000 to about 60,000 cps (at 140° F.) or less. Asphalt materials which are suitable may be selected from those which are typically used for road paving, repair and maintenance purposes. Thus, such asphalt includes natural asphalt, petroleum asphalt and petroleum tar. The natural asphalts include, for example asphaltite, such as Gilsonite, grahamite, and glancepitch, lake asphalt, such as Trinidad asphalt, and rock asphalt. The petroleum asphalt that may be used includes straight asphalt obtained by distillation of a crude oil, blown asphalt, produced by blowing an oxygen-containing gas into straight asphalt, and solvent extracted asphalt. The petroleum tar that may be used includes coal tar and oil gas tar. Tar pitch is equally suitable. Preferably, the asphalt which will be employed is an asphalt cement of the type typically used for road paving, repair and maintenance purposes. Such asphalts typically have penetrations ranging between about 20 to about 200 with AC-5 paving grade asphalt being especially suitable.

As the polymerizable vinyl monomer, use is preferably made of a monofunctional vinyl aromatic monomer having a general formula:

$$R_1-C=C-R_3$$
$$\phantom{R_1-}R_2\phantom{=C-}R_2$$

wherein $R_1$ is an aromatic group containing 6 to 12 carbon atoms, including a phenyl group, a substituted phenyl group wherein the substituent is any one of an amino group, a cyano group, a halogen group, a $C_1$ to $C_3$ alkoxy group, a $C_1$ to $C_3$ alkyl group, a hydroxy group, a nitro group, etc. $R_2$ is preferably hydrogen or lower alkyl e.g., a $C_1$ to $C_5$ alkyl and $R_3$ is hydrogen, lower alkyl or one of the following groups:

$$-CH_2OH, -CHO, -\overset{O}{\underset{\|}{C}}-X, -\overset{O}{\underset{\|}{C}}-OH, \text{ or } -CH_2-CN$$

wherein X is halogen, and preferably chlorine or bromine. Styrene is preferred. In conjunction with the vinyl aromatic monomer as described above, a polyfunctional vinyl aromatic monomer containing 6 to 12 carbon atoms in the aromatic ring and two or more polymerizable vinyl groups chemically bonded to the aromatic ring can optionally be employed. Preferred polyfunctional monomers are those having the general formula:

$$CH_2=CH-R_4-C=CH-R_6$$
$$\phantom{CH_2=CH-R_4-}\underset{R_5}{|}$$

wherein $R_4$ is a divalent aromatic group containing 6 to 12 carbon atoms, and preferably a phenylene group; and, $R_5$ and $R_6$ have the same meaning as is described above with respect to $R_2$ and $R_3$, respectively, for the monofunctional vinyl aromatic monomer. Illustrative of a suitable polyfunctional vinyl aromatic monomer is divinyl benzene. When use is made of a polyfunctional vinyl aromatic monomer in combination with a monofunctional vinyl aromatic monomer such as styrene, generally the monofunctional vinyl aromatic is present in a weight ratio of about 1:1 to 40:1 based on the weight of the polyfunctional vinyl aromatic monomer.

As the rubbery polymer, use can be made of a number of elastomeric materials which are well known to those skilled in the art. Included are natural rubbers as well as synthetic rubbers. Suitable are synthetic rubbers which are homopolymers of a conjugated diene (e.g., butadiene, isoprene, chloroprene, etc.) as well as various polymers which are substituted with a functional group containing a labile hydrogen atom. For example, various hydroxy, amino and like substituted homopolymers of conjugated dienes may likewise be used in the practice of this invention. Substituted butadienes are commercially available from, for example, Atlantic-Richfield under the trademark "Poly B-D", a series of hydroxy-terminated butadiene polymers; for example, use can be made of hydroxy-terminated butadiene homopolymers like Poly B-D R-15M which has a hydroxy number of 42 or Poly B-D R-45M.

Preferably, the rubber polymer is an elastomeric material formed by copolymerization of one or more of the conjugated dienes described above with one or more ethylenic monomers such as styrene as well as hydroxy, amino and mercapto-substituted derivatives thereof, acrylonitrile, methacrylonitrile, acrylic acid, methacrylic acid, etc. Included are butadiene-styrene rubbers, butadiene-acrylonitrile rubbers, etc. Hydroxy-terminated copolymers are likewise useful in the practice of this invention, including the hydroxy-terminated butadiene-styrene copolymer designated "Poly B-D CS-15" and hydroxy-terminated butadiene-acrylonitrile copolymers like Poly B-D CN-15 having a hydroxyl number of 39. Preferred are butadiene-styrene rubbers like SOLPRENE 1205C available from Phillips Petroleum.

The amount of the various ingredients may vary over a wide range. Preferably, however, the acrylamide will be employed in an amount of about 0.1%, and most desirably about 0.5%, to about 15%, based on the weight of asphalt, the vinyl aromatic will be used in an amount of about 0.5 to about 35% based on the weight of the asphalt, and the rubbery polymer will be employed in an amount of about 0.5 to about 30% based on the weight of asphalt. In accordance with the best mode of practicing the present invention, the materials and the amounts employed will be selected to produce a final product having a viscosity of about 1200 to about 2500 cps (at 285° F.) and most desirably about 1800 to about 2000 cps.

While the above describes the invention with sufficient particularity to enable those skilled in the art to make and use same, nonetheless further examplification follows.

The present compositions are easily emulsified using conventional emulsification equipment and effective emulsifying amounts of conventional emulsifiers. The emulsifiers employed are those which have been in typically employed in the past to produce rapid setting emulsions. These are exemplified by fatty amines, such as for example, fatty monoamines like coco amine, tall oil amine, tallow amine and generally $C_{16}$–$C_{20}$ fatty monoamines like oleyl amine, as well as by fatty diamines, such as for example, tallow diamine, coco diamine, tall oil diamine and generally $C_{16}$–$C_{20}$ fatty diamines like oleyl diamine.

As indicated above, all that need be done is that the cationic rapid setting emulsions described above, be combined with the conventional slow setting emulsion used for slurry seal applications with the amount of the former being present in effective break time decreasing amounts, but as indicated previously, in an amount sufficient to allow adequate mixing and the ability to discharge the slurry from the mixer of a slurry seal truck to the pavement to be treated. Generally, the amount of the rapid setting emulsion which will be employed will be in the range of about 5% to about 35%, based on the combined weight of the rapid setting emulsion and the slow setting emulsion. Preferably, the amounts will generally be about 10%. The foregoing is based upon the assumption that conventional asphalt concentrations will be employed in the respective emulsions, namely concentrations on the order of about 60 to about 65% by weight of asphaltic material.

The conventional cationic slow setting emulsions are manufactured in accordance with well known techniques using conventional emulsification equipment and conventional emulsifiers in effective emulsifying amounts. Representative of such emulsifiers are: quaternary amines, i.e., quaternary ammonium compounds, diquaternary amines, lignin amines, amide amines, imidazolines.

As indicated above, the foregoing generally describes the technique for employing a rapid setting cationic emulsion, containing the reaction product of an acrylamide asphalt and a vinyl aromatic monomer and a rubbery polymer, as an additive in effective breaktime decreasing amounts for a conventional cationic slow setting emulsion. While the vast majority of slurry seal applications employ slow setting cationic emulsions, nonetheless, occasionally, anionic slow setting emulsions are employed. These conventional slow setting anionic emulsions generally are manufactured using effective emulsifying amounts of anionic emulsifiers like lignin sulfonates. When it is desired to employ the present invention in slurry seal applications employing anionic slow setting emulsions, the rapid setting emulsions as disclosed herein, will be manufactured by employing an anionic emulsifier in effective emulsifying amounts. Such emulsifiers for producing an anionic rapid setting emulsion are represented by the fatty acids like $C_{16}$–$C_{20}$ fatty acids, e.g., oleic acid, as well as tall oil fatty acid and tallow fatty acid.

While the above describes the present invention with sufficient particularity to enable those skilled in the art to make and using, nonetheless, there follows a representative example showing the benefits of the present invention.

EXAMPLE

Using a charge of about 80% by weight of AC-5 asphalt, 0.5% by weight of dimethylaminopropylmethacrylamide (DMAPMA), about 9.5% by weight of styrene, and about 10% by weight of Solprene 1205C styrene-butadiene elastomer having a molecular weight of about 80,000 to about 100,000, a composition was produced as follows. Asphalt, at a temperature of about 250° F. to about 310° F. was pumped into a reactor equipped with an agitator and a reflux condenser and followed by the addition of the rubber, DMAPMA and styrene. The ingredients were then heated at a temperature of about 348° F. for about 24 hours with agitation and under reflux. The reacted material has a viscosity of 1800-2000 cps at 285° F.

A cationic rapid set (CRS) emulsion of the above chemically modified asphalt was prepared as follows. An aqueous emulsification medium was formulated containing about 1.5% by weight of Arosurf AA-60 emulsifier (oleyl amine) and about 0.25% by weight of hydroxyethyl cellulose as a stabilizer, the pH being adjusted to about 2.5-3.5 using hydrochloric acid. Using a colloid mill, an emulsion was prepared using about 60% to about 65% (by weight) of the above chemically modified asphalt and about 35% to about 40% of the aqueous emulsification medium. The chemically modified asphalt was supplied to the colloid mill at a temperature of about 285° F. and the aqueous emulsification medium at a temperature of about 100° F.

The following will demonstrate some of the benefits of the present invention as well as exemplify some unexpected results. Reference composition means a slurry seal composition which is formulated from about 100 grams of aggregate typically employed in slurry seal applications, 2 grams of Portland cement, about 10 to about 12 grams water and about 12 to about 18 grams of asphaltic aqueous emulsion. The emulsion of the reference composition was either a standard slurry seal slow setting emulsion or an admixture of such an emulsion with an emulsion contemplated for use in accordance with the present invention. Additionally, by experiment it has been determined when a mix time of at least about 1 minute exists, such mix time is adequate for practical utilization in conventional slurry seal application equipment.

A slurry seal formulation was manufactured using the reference composition wherein the exclusive emulsion employed was a cationic quick-setting, slow set emulsion commercially supplied by Koch Asphalt Company as their Cationic Quick Set emulsion. Upon combining the ingredients, it was found that after about 2 to about 3 miinutes the mixture could still be manually mixed, thus indicating acceptable mix times. Using the same ingredients, the materials were mixed into a slurry and then formed into patties having a diameter on the order of about 4 inches. An absorbent paper towel was periodically positioned on top of the patty as a means for detecting the break time of the emulsion. The appearance of a brownish residue on the towel indicates that the emulsion is not completely broken, whereas breaking of the emulsion is indicated when the towel is moist from absorption of water but the towel is free of brownish residual asphalt. It was determined that the emulsion broke after about one hour. In similar testing wherein the emulsion, instead of being such as cationic quick setting, slow set was a traditional cationic slow set emulsion the break time is about two hours or so.

Another reference composition was employed wherein the sole emulsion in the reference composition was the cationic rapid setting emulsion produced above. This emulsion when combined with the other ingredients of the reference formulation showed substantially no mix time; that is after only a few seconds the mass was substantially incapable of manual mixing which indicates unacceptability for a slurry seal application.

Another reference composition was prepared in which the emulsion employed constituted a blend of about 10% by weight of the above produced cationic rapid set emulsion and 90% of the above indicated Koch cationic quick set emulsion. Upon combining the ingredients and mixing the material could be manually mixed for a period of about 1 to 2 minutes. Thus, indicating acceptable mix times for a slurry seal application. When patties were made from such reference composition, it was found that the break times were on the order of about 10 to about 20 minutes. It is believed that this dramatic decrease in break time is the result of the rapid set emulsion containing the reaction product of asphalt, an acrylamide, a vinyl aromatic monomer and a rubbery polymer unexpectedly catalyzing the breaking of the conventional emulsion for if such was not the case, notwithstanding the fact that the cationic rapid set emulsion may have broken, the towel would contain brownish asphalt residue after such 10-20 minute period of time because it takes, as indicated above, on the order of about an hour for the cationic quick set emulsion to break.

The foregoing thus demonstrates the unexpected results obtainable from the present invention. Thus, it is believed to be possible, employing the present invention with a conventional slurry seal application to, provide a quick traffic system, i.e., one that can be opened to traffic sooner than with the use of conventional slurry seal technology. Additionally, because of the combination of the two emulsions as contemplated herein, the resulting asphaltic layer will have the improved properties indicated previously. Field trials have demonstrated the present system to be outstandingly adapted for its purposes. Nonetheless, it should be indicated that while it is believed that the present system can be opened to traffic earlier because of the preliminary experimental nature of this invention and out of an abundance of caution traffic has not been opened in these field trials prior to the time that it is opened when a typical quick setting slow set asphaltic emulsion slurry seal application is employed.

In addition to being well adapted for slurry seal applications, the blended emulsion compositions, obtained by combining the above indicated rapid set emulsions with conventional slow set emulsions, either with or without fine aggregate, are adapted to other beneficial uses. They, for example, may be employed as cold overlays, in roofing applications or as protective coatings for various surfaces. Additionally, if desired, glass fibers and/or glass flakes may be incorporated therein for reinforcing purposes.

While the above describes the present invention it of course be apparent that modifications are possible which pursuant to the patent statutes and laws do not depart from the spirit and scope thereof.

We claim:

1. In a pavement surface-treating method comprising applying a slurry seal composition to pavement, said composition comprising aggregate and a slow setting asphalt emulsion, the improvement wherein said emulsion further comprises, in admixture therewith, an effective breaktime decreasing amount of an emulsion containing the prereacted reaction product of an acrylamide asphalt having a viscosity of less than about 120,000 cps (at 140° F.), a vinyl aromatic monomer and a rubbery polymer.

2. The improvement of claim 1 wherein said asphalt is AC-5 paving grade asphalt, said vinyl aromatic comprises styrene, said rubbery polymer is a copolymer of styrene and butadiene and said acrylaminde is dimethylamineopropylmethacrylamide and wherein said latter emulsion contains effective emulsifying amounts of oleyl amine.

3. In a continuous pavement surface treating method comprising combining a cationic slow setting asphaltic emulsion and aggregate in a mixer while moving said mixer along said pavement to be surface treated, mixing said emulsion and aggregate to form a slurry seal composition, discharging said composition unto said pavement, whereby it breaks and cures to provide a traffic resistant surface treatment on said pavement, the improvement wherein there is combined with said asphaltic emulsion, a cationic emulsion containing the reaction product of an acrylamide, asphalt having a viscosity of less than 120,000 cps (at 140° F.), a vinyl aromatic monomer and a rubbery polymer, said latter emulsion being present in an effective break time decreasing amount.

4. The improvement of claim 3 wherein said acrylamide is a compound of the formula

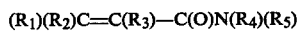

$(R_1)(R_2)C=C(R_3)-C(O)N(R_4)(R_5)$ wherein $R_1$, $R_2$ and $R_3$ are independently selected from hydrogen and a $C_1$-$C_3$ alkyl; $R_4$ and $R_5$ are independently selected from hydrogen, a $C_1$-$C_3$ alkyl and a radical of the formula

$-R_6-N(R_7)(R_8)$ wherein $R_6$ is an alkylene group of 1 to 5 carbon atoms and $R_7$ and $R_8$ are independently selected from hydrogen or a $C_1$-$C_3$ alkyl.

5. The improvement of claim 4 wherein $R_4$ or $R_5$ is said radical of the formula a $-R_6-N(R_7)(R_8)$ and wherein said asphalt has a viscosity of less than about 75,000 cps (at 140° F.).

6. The improvement of claim 5 wherein $R_1$ and $R_2$ are hydrogen.

7. The improvement of claim 5 wherein $R_6$ is ethylene or propylene.

8. The improvement of claim 5, wherein $R_3$, $R_7$ and $R_8$ are hydrogen or methyl.

9. The improvement of claim 4 wherein said vinyl aromatic monomer comprises styrene and said rubbery polymer is natural rubber, a diene homopolymer or a copolymer of a diene and an olefinically unsaturated monomer.

10. The improvement of claim 3 wherein said acrylamide is dimethylaminopropylmethacrylamide said vinyl aromatic monomer comprises styrene, said asphalt has a viscosity of about 40,000 to about 60,000 cps and said rubbery polymer is a copolymer of styrene and butadiene. The improvement of claim 3 wherein said emulsion containing said reaction product is a rapid setting emulsion.

11. The improvement of claim 10 wherein said rapid setting emulsion includes effective emulsifying amounts of a fatty amine.

* * * * *